United States Patent [19]

Berkovich et al.

[11] Patent Number: 4,868,814
[45] Date of Patent: Sep. 19, 1989

[54] MULTILEVEL CONCURRENT COMMUNICATIONS ARCHITECTURE FOR MULTIPROCESSOR COMPUTER SYSTEMS

[75] Inventors: Semyon Berkovich, Rockville; Henry C. Yee, Columbia; Chris J. Walter, Ellicott City, all of Md.

[73] Assignee: Allied-Signal Inc., Morris Township, Morris County, N.J.

[21] Appl. No.: 223,453

[22] Filed: Jul. 22, 1988

[51] Int. Cl.⁴ ............................................. H04Q 11/04
[52] U.S. Cl. ....................................... 370/67; 370/85.1
[58] Field of Search ..................... 370/58, 85, 88, 94, 370/67; 340/825.5

[56] References Cited

U.S. PATENT DOCUMENTS

| | | | |
|---|---|---|---|
| 4,493,074 | 1/1985 | Walter et al. | 370/119 |
| 4,628,504 | 12/1986 | Brown | 370/85 |
| 4,677,611 | 6/1987 | Yanosy, Jr. et al. | 370/85 |

Primary Examiner—Joseph A. Orsino
Assistant Examiner—Frank M. Scutch, III
Attorney, Agent, or Firm—Howard G. Massung

[57] ABSTRACT

A method and apparatus is described for distributing data in a hierarchically connected system (10) comprising a plurality of nodes (12-25) at each of a plurality of hierarchical levels, one or more bidirectional buses (29-30, 31,32) interconnecting mutually exclusive nodes at each hierarchical level, and a sender (49) for receiving and transmitting data located at each node (12-25) for transmitting and receiving data under the Content Induced Transaction Overlap (CITO) protocol and for transmitting and receiving data without regard to the CITO protocol. Each bidirectional bus (27-32) is interconnected through a node to a node on a bidirectional bus at a higher hierarchical level. Several virtual buses may be formed for distribution of the messages over one or more bidirectional buses (27-33) by controlling the senders (90,92,94,96) at each node by a slot controller (88) which activates the senders (90,92,94,96) as a function of time slot. The invention overcomes the problem of distributing data to all nodes (12-25) in a hierarchically connected system as well as to nodes (14-17) at a selected hierarchical level or to nodes (18-19) hierarchically connected subordinate to a node (14).

19 Claims, 4 Drawing Sheets

MULTILEVEL CONCURRENT COMMUNICATIONS ARCHITECTURE FOR MULTIPROCESSOR COMPUTER SYSTEMS

BACKGROUND OF THE INVENTION

1. Field of the Invention

This invention relates to a digital communication system interconnecting a plurality of nodes, usually computing nodes, having a source of messages and more particularly to a hierarchical computing structure interconnected by digital buses.

2. Description of the Prior Art

In U. S. Pat. No. 4,493,074, which issued on Jan. 8, 1985 to C. J. Walter et al., a Content Induced Transaction Overlap communication system was described for transmitting data over a single communication channel between a plurality of senders and at least one receiver. The senders simultaneously transmit the highest order of bits of their data word, one bit at a time, in serial fashion and monitor the state of the communication channel. Transmission of data bits is terminated by all senders which detect a difference between the state of their transmitted data bit and the state of the communication channel. After a word is transmitted on the communication channel, bit competition is performed to determine among those senders still having data bits remaining to be transmitted, which sender or senders will transmit their remaining data bits. Transmission of data bits and bit competition at the conclusion of a transmitted word continue alternately until all senders have completed sending their respective data word.

SUMMARY OF THE INVENTION

In accordance with the present invention, an apparatus and method is provided for distributing data comprising a plurality of nodes at each of a plurality of hierarchical levels, each node including circuitry for receiving and transmitting data, the plurality of nodes at a hierarchical level interconnected by one or more bidirectional buses, each bidirectional bus interconnected through a node to a node on a bidirectional bus at a hierarchical level by a first sender, each first sender having a first port coupled to a first bidirectional bus at a first hierarchical level and a second port coupled to a second bidirectional bus at a higher hierarchical level, the first sender having first circuitry coupled to the first port for receiving a first data bit transmitted on the first bidirectional bus by means of the Content Induced Transaction Overlap (CITO) protocol during a first time slot, the first sender having second circuitry coupled to the first circuitry and to the second port for transmitting the first data bit on the second bidirectional bus by means of the CITO protocol during a second time slot after the first time slot, the second circuitry including a channel status register for storing the data bits actually transmitted under the CITO protocol on the second bidirectional bus during the second time slot, the first sender having fourth circuitry coupled to the first port and to the second circuitry for transmitting without regard to the CITO protocol the data bits in the channel status register on to the first bidirectional bus during a third time slot after the second time slot.

The invention further includes a method and apparatus for transmitting data between first and second bidirectional buses by way of at least a third bidirectional bus comprising a first sender having a first port coupled to the first bidirectional bus and a second port coupled to the third bidirectional bus, a second sender having a first port coupled to the second bidirectional bus and a second port coupled to the third bidirectional bus, each first and second senders having first circuitry coupled to the first port for receiving a respective first data bits transmitted on the respective first and second bidirectional buses by means of the Content Induced Transaction Overlap (CITO) protocol during a first time slot, each first and second sender having second circuitry coupled to the first circuit and to the second port for transmitting the respective first data bits on the third bidirectional bus by means of the CITO protocol during a second time slot after the first time slot, the second means including a channel status register for storing the data bit actually transmitted under the CITO protocol on the third bidirectional bus during the second time slot, each first and second senders having fourth circuitry coupled to the first port and to the second circuitry for transmitting without regard to the CITO protocol the data bit stored in the channel status register onto the respective first and second bidirectional buses during a third time slot after the second time slot.

DESCRIPTION OF THE PREFERRED EMBODIMENTS

Figure 1:
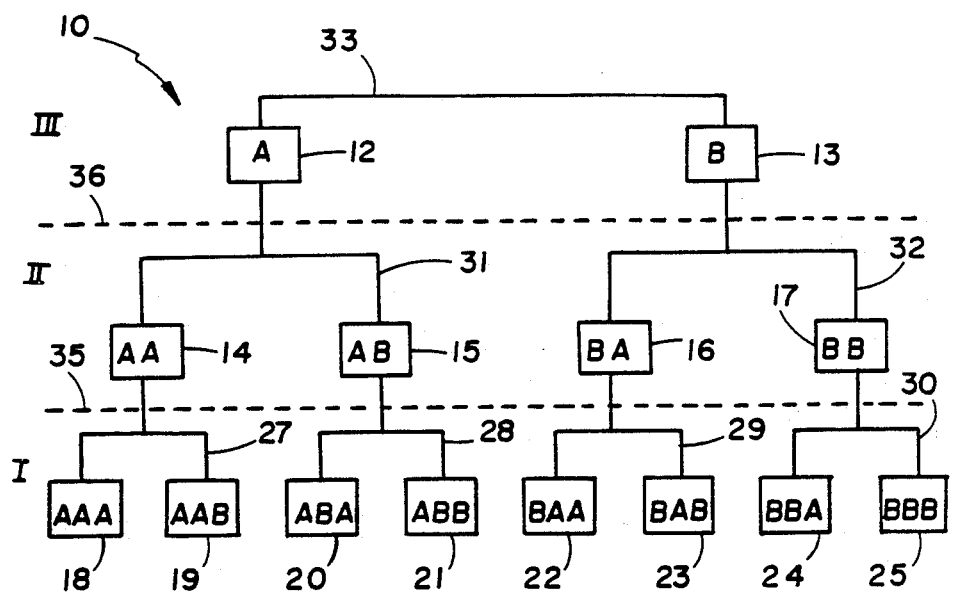
FIG. 1 is a block diagram of a hierarchically connected communication system comprising a tree of computing nodes, each having two offspring.

Referring to FIG. 1, a hierarchically connected system 10 consisting of a tree of computing nodes 12-25 wherein each node may receive and transmit data. Hierarchically connected system 10 has no conceptual limit on the number of offspring; the specific tree shown in FIG. 1 was chosen to simplify the explanation. As shown in FIG. 1, one or more nodes may be interconnected to each bidirectional bus 27-33. System 10 may be extended to lower hierarchical levels by adding additional bidirectional buses to respective nodes. Nodes 18-25 may be at a first hierarchical level. Nodes 14-17 may be at a second ascending hierarchical level, and nodes 12 and 13 may be at a third or global hierarchical level. Nodes 14, 18 and 19 are interconnected by bidirectional bus 27. Nodes 15, 20 and 21 are interconnected by bidirectional bus 28. Nodes 16, 22 and 23 are interconnected by bidirectional bus 29. Nodes 17, 24 and 25 are interconnected by bidirectional bus 30. Bidirectional buses 27-30 interconnect nodes 18-25 at a first hierarchical level to nodes 14-17 at a second hierarchical level. Nodes 12, 14 and 15 are interconnected by bidirectional bus 31. Nodes 13, 16 and 17 are interconnected by bidirectional bus 32. Nodes 14-17 are at the second hierarchical level and are interconnected to nodes 12 and 13 at a third hierarchical level, respectively, by bidirectional buses 31 and 32. Nodes 12 and 13 are interconnected by bidirectional bus 33. Bidirectional bus 33 interconnects nodes at the third hierarchical level and represents the highest hierarchical level in system 10.

Data bits are transmitted during discrete time slots over bidirectional buses 27-33 to be described and reconstructed utilizing a protocol termed Content Induced Transaction Overlap (CITO) which is described in U. S. Pat. No. 4,493,074 entitled "Content Induced Transaction Overlap (CITO) Communication Channel" by C. J. Walter et al. which issued on Jan. 8, 1985 and assigned to the Bendix Corporation, now merged into Allied-Signal Inc., the assignee herein. Under the CITO protocol when a logic one and a logic zero are transmitted simultaneously, the logic zero dominates, that is, collisions between a logic one and a logic zero result in the logic zero being transmitted. Nodes 14-17 may transmit on the lower hierarchical level bus 27-30, respectively, and nodes 14-17 shall listen on the bus to receive the respective data bit from the respective bus during selected time slots. Thus, for example, bidirectional bus 27 may have its bits received by node 14 even though node 14 may also be transmitting on bus 27. Node 14 transmits at a later discrete time slot on bidirectional bus 31 the data bit it received from bidirectional bus 27 using the CITO protocol. Node 12 receives the transmitted data bit on bidirectional bus 31 and at a later discrete time slot transmits the data bit on bidirectional bus 33 using the CITO protocol. In this manner, data from nodes 12-25 are transmitted through the various hierarchical levels via bidirectional buses to the highest hierarchical level. This composite global bit is sent down one hierarchical level in a succeeding time slot, and those nodes send it down to the next lower hierarchical level in another succeeding time slot.

Each node 12-25 usually includes independent processor and wherein by using the CITO protocol on the bidirectional buses, the nodes will be interconnected to form a computer network, as shown in FIG. 1, with three levels of hierarchy. Hierarchical level I, has nodes 18-25 which are below reference line 35. Hierarchical level II has nodes 14-17 which are between reference lines 36 and 35. Hierarchical level III contains nodes 12 and 13 which are above reference line 36. The number of levels of hierarchy may be expanded to any given depth of hierarchy by adding bidirectional buses and nodes below a node. The number of nodes at each hierarchical level may be expanded by adding nodes to a bidirectional bus. Further, a node at a certain hierarchical level may be passive, that is, not connected to an independent processor but merely be a relay node between a lower hierarchical level and a higher hierarchical level. For convenience, a node naming convention is suggested to describe parts of the hierarchically connected system. The name of a node starts with the name of the node at the next hierarchical level, and has a suffix that differentiates itself from other nodes at its own level. Thus, the node AB has nodes ABA, ABB, ABC, etc. connected to it. A bus is given the name of a node with the highest level node connected to that bus. Thus, node A, corresponding to node 12, is coupled to bus A which corresponds to bidirectional bus 31.

Figure 2:
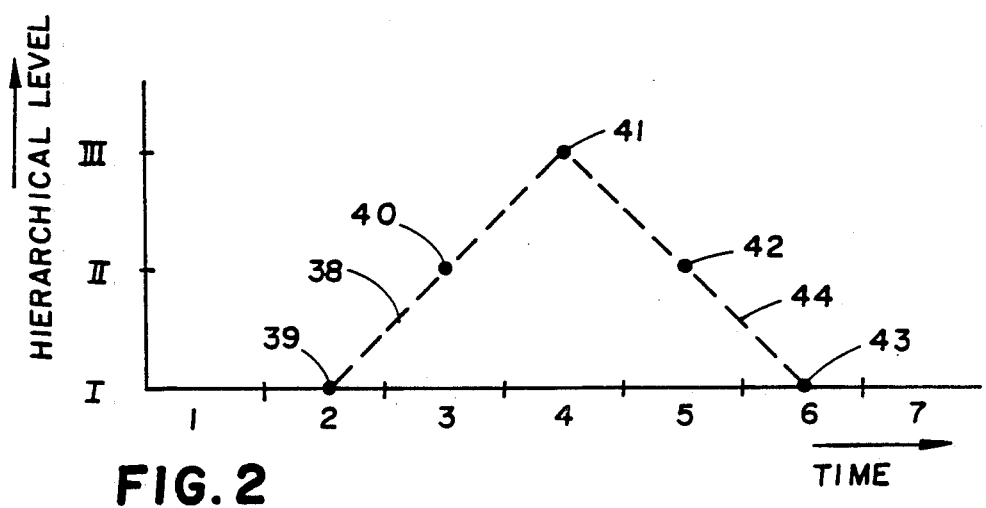
FIG. 2 is a graph showing the flow of data in discrete time slots.

FIG. 2 shows the flow of a data bit from hierarchical level I to hierarchical level III and back to hierarchical level I in discrete time slots. In FIG. 2, the ordinate represents hierarchical level I, II, III and the abscissa represents time defining time slots 1 through 7. During time slot 2, all nodes connected to bidirectional bus 27, including node 14, transmit on bidirectional bus 27. At the same time, the same action occurs on bidirectional buses 28-30. The first bit from each node on hierarchical level I and hierarchical level II, is transmitted on bidirectional buses 27-30 using CITO transmitters following CITO conventions.

In time slot 3 all nodes connected to bidirectional bus 31, including node 12, transmit on bidirectional bus 31. At the same time, all nodes connected to bidirectional bus 32, including node 13, transmit on bidirectional bus 32. Nodes 14-17 transmit what they receive during time slot 2 by way of bidirectional buses 27-30, respectively.

In time slot 4 nodes 12 and 13 transmit on bidirectional bus 33, the top level bus, what they received during time slot 3. This bit represents the first CITO global bit of all nodes 12-25 in the system.

In time slot 5, nodes 12 and 13 transmit the data bit transmitted on bidirectional bus 33 in time slot 4 to bidirectional buses 31 and 32.

In time slot 6, nodes 14 and 15 transmit the data bit transmitted on bidirectional bus 31 in time slot 5, to bidirectional buses 27 and 28, respectively. Also, nodes 16 and 17 transmit the data bit transmitted on bidirectional bus 32 in time slot 5 to bidirectional buses 29 and 30, respectively. At this point, all nodes in the system have received the first CITO global bit from all other nodes in the system. It is understood that the data bits propagate or travel up in hierarchical levels on the bidirectional buses using the CITO protocol. The data bit transmitted on bidirectional bus 33 during time slot 4 is retransmitted without regard to the CITO protocol on bidirectional buses 31 and 32 in time time slot 5 and bidirectional buses 27-30 in time slot 6. Thus, all nodes receive the composite global data bit by time slot 6.

Curve 38, shown in FIG. 2, shows the flow of data from hierarchical level I to hierarchical level III in time slots 2, 3, 4 by way of points 39-41, respectively. Curve 44 shows the flow of data from hierarchical level III to hierarchical level I from time slots 4, 5, 6 by way of points 41-43, respectively.

Time slots 1 and 7 are shown empty.

The entire sequence occurring in time slots 2-6 repeat until all nodes have received and reconstructed all messages from other nodes in the hierarchically connected system 10. As in the conventional CITO protocol, all nodes queue up the next message and begin the sequence again during the next bucket.

After one or more nodes has completed transmitting the first message, which may be a word, bit competition may occur throughout the hierarchically connected system by each node transmitting the bits in its bit position register in the same manner as the data bits were transmitted.

Figure 3:
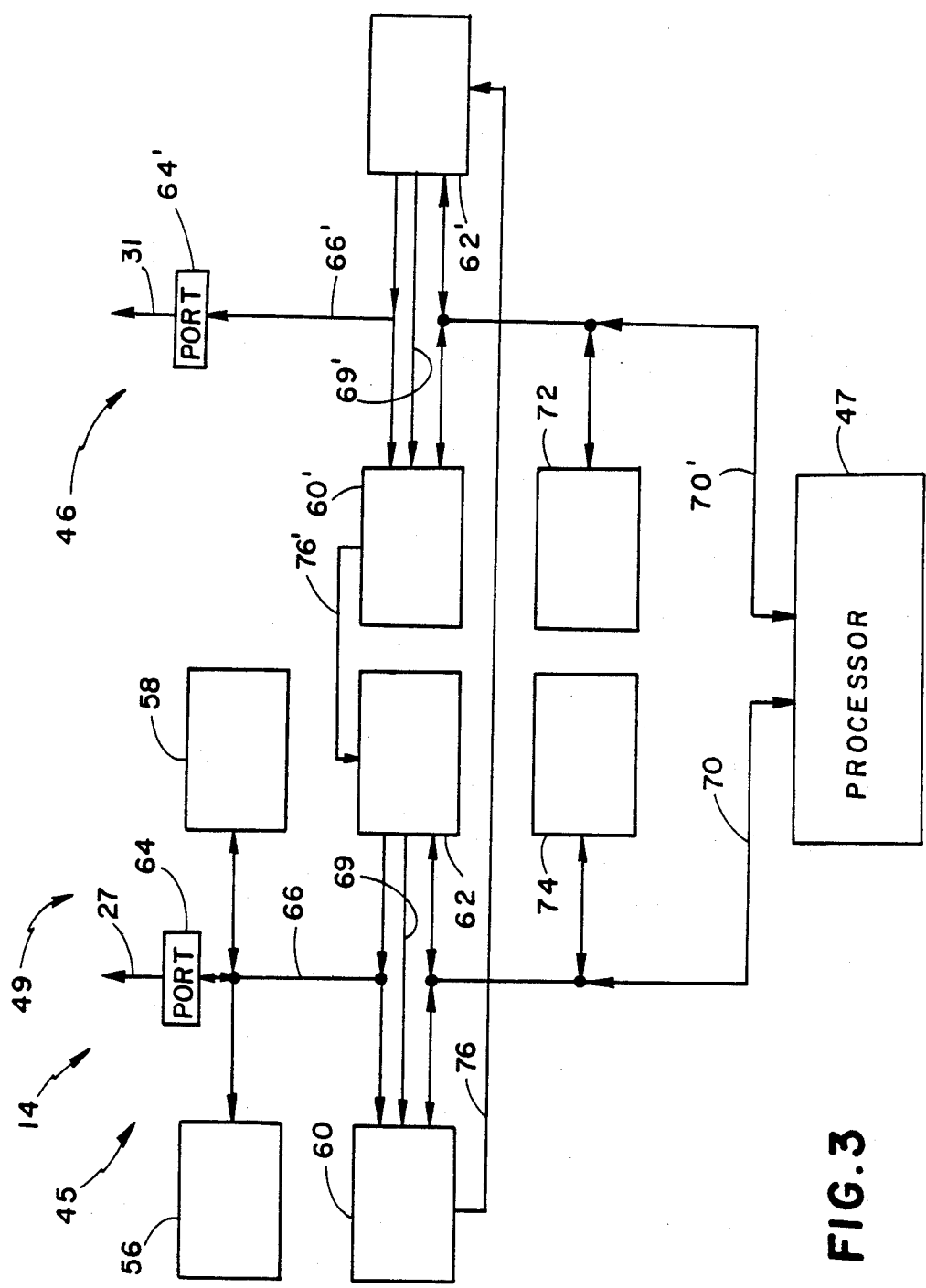
FIG. 3 is a block diagram of one embodiment of the invention.

FIG. 3 is a block diagram of node 14, shown in FIG. 1. Node 14 includes first sender 49, including sender 45 for transmitting and receiving data on bidirectional bus 27 and sender 46 for transmitting and receiving data on bidirectional bus 31 and processor 47, which may utilize data received and generate data to be transmitted.

Sender 45 has a word boundary register 56 for storing the number of bits remaining in the data word being received over bidirectional bus 27. Sender 45 has a bit position register 58 for storing the number of bits of a data word or message remaining to be transmitted. Sender 45 has a channel status register 60 for storing the received bit and for comparing the binary level of the transmitted bit with the binary level of the received bit.

Bidirectional bus 27 is coupled through port 64 to lead 66. Port 64 functions to couple lead 66 to bidirectional bus 27 at appropriate times. Port 64 is coupled over lead 66 to word boundary register 56, bit position register 58, channel status register 60 and data word register 62. Data word register 62 couples data over lead 69 to channel status register 60. Processor 47 is coupled over lead 70 to sender 45 and more specifically to channel status register 60, data word register 62 and index register 74. Index register 74 functions to point to the next data bit in data word register 62 to be transmitted. Channel status register 60 is coupled over lead 76 to bit register 62' of sender 46. Lead 76 functions to transfer the data bit received from bidirectional bus 27 by way of channel status register 60 to bit register 62' for transmission on bidirectional bus 31. Processor 47 is coupled over lead 70' to sender 46 and more specifically to channel status register 60', bit register 62' and word reconstructor 72.

Sender 46 functions similarly to sender 45. The prime reference numbers associated with functions in sender 46 correspond to like functions in sender 45 having the corresponding reference number.

Senders 45 and 46 operate similarly to sender 10 as described in U.S. Pat. No. 4,493,074, which issued on Jan. 8, 1985 to C. J. Walter et al. In U. S. Pat. No. 4,493,074, the senders simultaneously transmit the highest order of bits of their data word or message, one bit at a time in serial fashion and monitor the state of the communication channel. Transmission of data bits is terminated by all senders which detect a difference between the state of their transmitted data bit and the state of the communication channel. Bit competition performed at the end of each transmitted data word determines among those senders still having data bits remaining to be transmitted, which sender has lexicographically the next smallest word, and activates the sender to transmit its remaining data bits.

During time slot 2, as shown in FIG. 2, sender 45 coupled to bidirectional bus 27 receives a data bit in channel status register 60 that was transmitted on bidirectional bus 27 by means of the CITO protocol. During time slot 2, sender 45 may also attempt to send a data bit stored in data word register 62 using the CITO protocol.

During time slot 3, sender 46 receives the data bit from channel status register 60 by way of bit register 62' and retransmits the data bit on bidirectional bus 31 by means of the CITO protocol. Sender 46 receives the data bit actually transmitted on bidirectional bus 31 in channel status register 60'.

During time slot 5, channel status register 60' receives the data bit transmitted on bidirectional bus 31 from node 12 unconditionally without regard to the CITO protocol. That is, bit register 62' does not attempt to transmit a data bit on bidirectional bus 31 during time slot 5.

During time slot 6, the data bit in channel status register 60' is transferred over lead 76' to data word register 62 which is then transmitted on bidirectional bus 27 without regard to the CITO protocol. When senders 45 and 46 operate without regard to the CITO protocol, bit position register 58 remains unchanged. Also, index registers 74 remains unchanged.

Nodes 15-17 may include senders like 45 and 46 which may operate in the same manner as node 14. Upper level nodes like nodes 12 and 13 would operate like node 14 except in time slots 3, 4 and 5.

Figure 4:
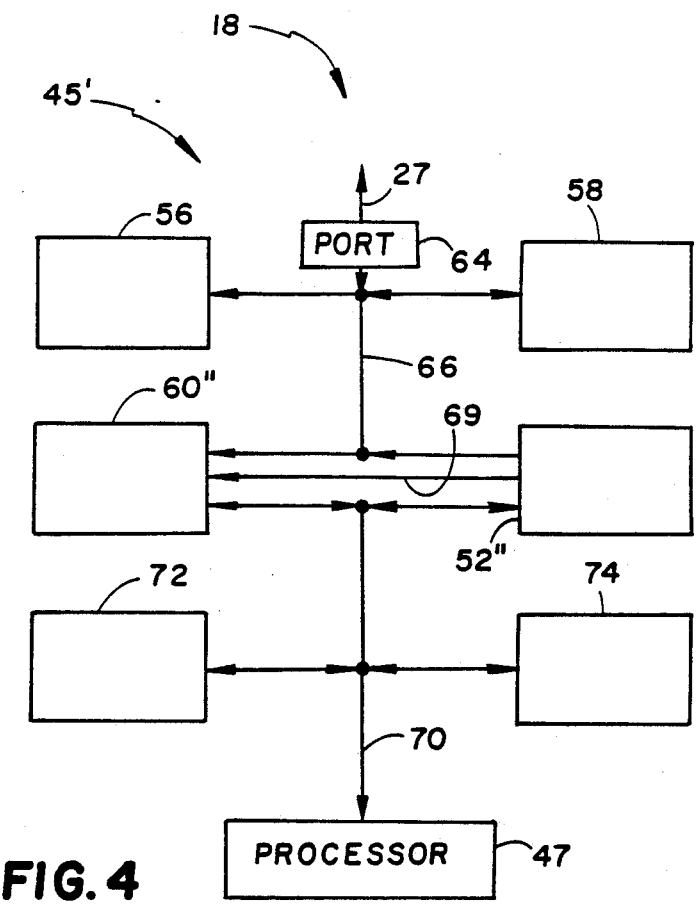
FIG. 4 is a block diagram of a first alternate of the invention.

FIG. 4 is a block diagram of sender 45'. In FIG. 4, like references are used for functions corresponding to the apparatus of FIG. 3. Sender 45' is similar to sender 45 except sender 45' has word reconstructor 72 and does not have leads 76 and 76'. Sender 45' and processor 47 may comprise node 18, as shown in FIG. 4, which would also be suitable for nodes 19-25. It is noted that nodes 18-25 have one port for transmitting and receiving data. Nodes 18-25 would transmit data under the CITO protocol during time slot 2, as shown in FIG. 2, on bidirectional bus 27, as shown in FIG. 1. Nodes 18-25 would receive data unconditionally without regard to the CITO protocol on bidirectional buses 27-30 during time slot 6.

Figure 5:
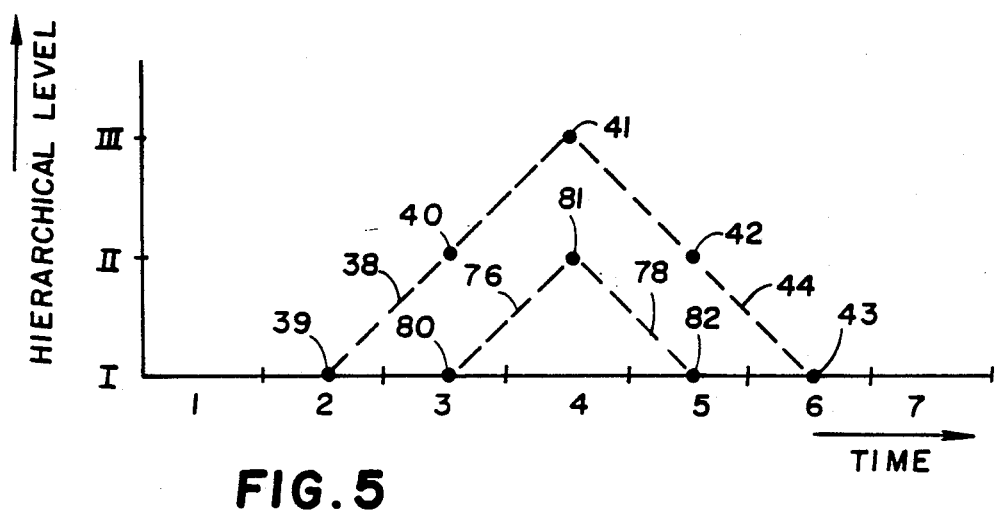
FIG. 5 is a graph showing the concurrent flow of data in discrete time slots.

FIG. 5 is a graph showing the concurrent flow of data in hierarchically connected system 10, shown in FIG. 1, in discrete time slots. In FIG. 5, like references are used for data points and curves shown in FIG. 2. While full system communication is taking place, as shown by curves 38 and 44, in time slots 2-6, it is possible to pass other messages in unused time slots in other hierarchical levels. In particular, it would be useful to incorporate communications that would cover all nodes subordinate to any one of the nodes on the top level, node 12 and 13. FIG. 5 shows curves 76 and 78 which permit communication to all nodes 12 and below concurrently with global communications shown by curves 38 and 44.

Since time slots 3 and 5 have not been used at the lowest level, another set of messages sharing a common top level node, such as node 12 or 13, may be transmitted from nodes 18-21 to node 12 and back or from nodes 22-25 to node 13 and back. Time slot 4 is used for nodes 14 and 15 and 12 to transmit a data bit on bidirectional bus 31.

In time slot 3, all nodes connected to bidirectional bus 27, including node 14, may transmit on bidirectional bus 27. At the same time, all nodes connected to bidirectional buses 28-30 transmit on the respective bus. Data transmitted on bidirectional buses 27 and 28 will be restricted to nodes subordinate to node 12. Data transmitted on bidirectional buses 29 and 30 will be restricted to nodes subordinate to node 13. Point 80, shown in FIG. 5, represents that data is being transmitted on bidirectional buses 27-30 during time slot 3.

In time slot 4, shown in FIG. 5, all nodes connected to bidirectional bus 31, including node 12, transmit on bidirectional bus 31. Likewise, in time slot 4, all nodes connected to bidirectional bus 32, including node 13, transmit on bidirectional bus 32. In time slot 4, node 14 transmits what it receives during time slot 3 on bidirectional bus 27. Node 15 transmits in time slot 4 what it receives in time slot 3 on bidirectional bus 28. Node 16 transmits in time slot 4 what it receives in time slot 3 on bidirectional bus 29. Node 17 transmits in time slot 4 what it receives in time slot 3 on bidirectional bus 30. The transmission during time slots 3 and 4 is by way of the CITO protocol.

In time slot 5, node 14 transmits on bidirectional bus 27 the bit received during time slot 4 on bidirectional bus 31. Node 15 transmits on bidirectional bus 28 the bit received during time slot 3 on bidirectional bus 31. Node 16 transmits on bidirectional bus 29 the bit it received on bidirectional bus 32 during time slot 4. Node 17 transmits on bidirectional bus 30 in time slot 5 what it received on bidirectional bus 32 in time slot 4. During time slot 5, nodes 18-25 do not transmit under the CITO protocol but receive unconditionally the data bit transmitted on bidirectional buses 27-30.

In time slot 5, all nodes 12, 14, 15, 18–21 and nodes 13, 16, 17, 22–25 have respectively received the first message bit from all other nodes hierarchically connected to the highest level node 12 or 13, respectively.

The entire sequence repeats using time slots 3 and 5 on hierarchical level I and time slot 4 on hierarchical level II until all nodes hierarchically connected to node 12 or node 13 have received and reconstructed their messages. As in the conventional CITO protocol, nodes that complete all their messages queue up the next set of messages and begin again after each node has sent its current message.

FIG. 5 shows data points 81 and 82 representing the transmission of the data bit on bidirectional bus 31 in time slot 4 and on bidirectional buses 27 and 28 in time slot 5, respectively. Curves 76 and 78 represent the flow of data on bidirectional buses from time slot 3 to time slot 5. Even though the same buses are used, the message sent during time slot 3 to time slot 5 is independent from the message sent during time slot 2 to time slot 6.

Figures 6, 7:
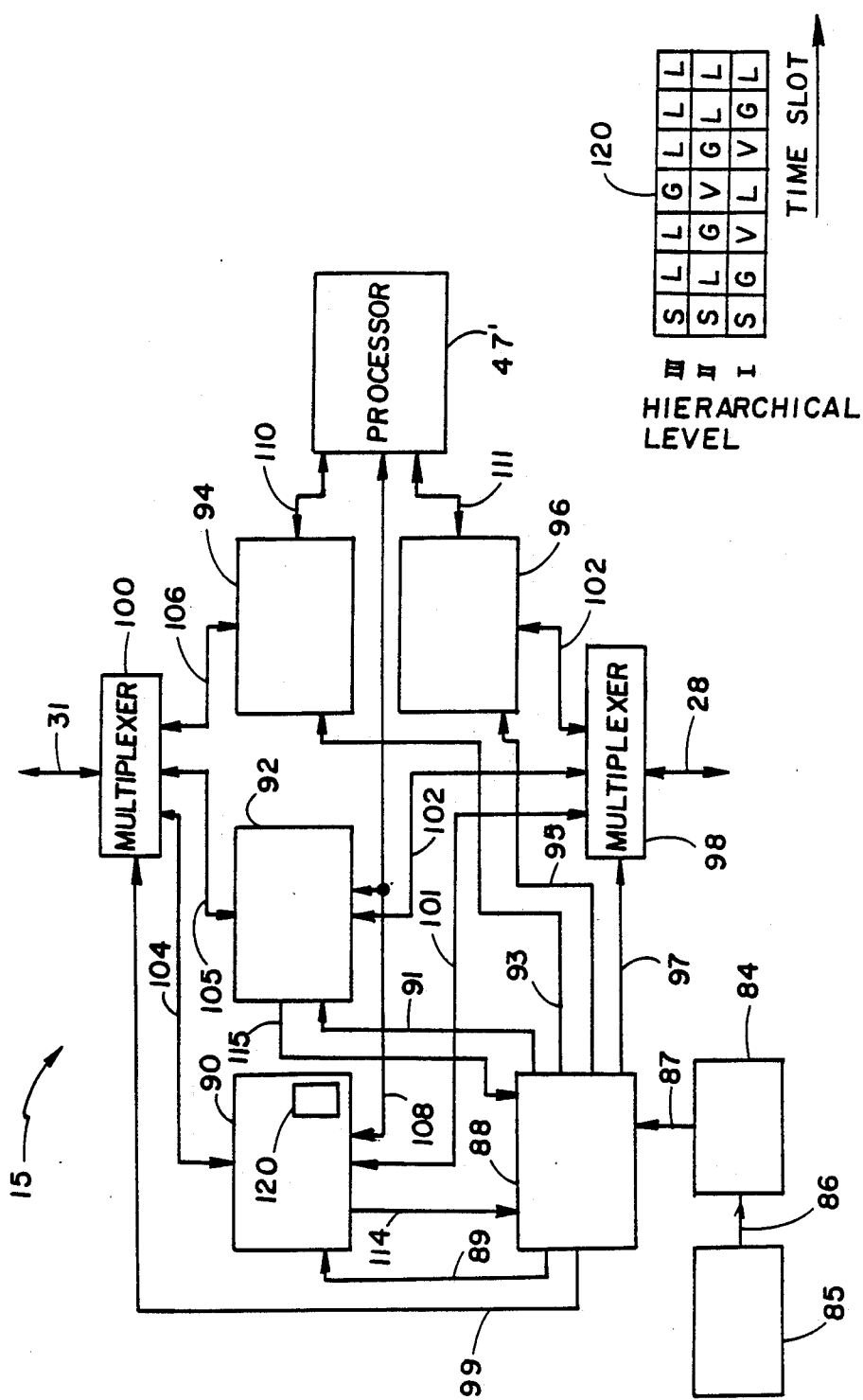
FIG. 6 is a second alternate embodiment of the invention.
FIG. 7 is a template drawing depicting data flow.

FIG. 6 is a block diagram of node 15, a level II node, for transmitting and receiving a plurality of concurrent messages. It shows how concurrent messages are sent, using independent senders multiplexed for each message for transferring the message from bidirectional bus 28 to bidirectional bus 31.

In FIG. 6, slot counter 84 functions to generate a slot number such as from one to seven in response to a signal received from central clock 85 over lead 86. Central clock 85 may distribute the clock signal over lead 86 to all nodes, 12–25, in hierarchically connected system 10. Central clock 85 may not necessarily be located physically with node 15. Independent, but synchronized clocks may also be used. Slot counter 84 as well as slot counters in other nodes such as nodes 14, 16 and 17 determine the slot time of the system. The slot time is coupled over lead 87 to an input of slot controller 88. Slot controller 88 functions to generate control signals to activate the proper sender and to route the data through the multiplexer to the proper sender in the proper time slot. Slot controller 88 couples a control signal over lead 89 to a control input of global bus sender 90. Slot controller 88 couples a control signal over lead 91 to a control input of vertical bus sender 92. Slot controller 88 couples a control signal over lead 93 to a control input of local upper bus sender 94. Slot controller 88 couples a control signal over lead 95 to a control input of local lower bus sender 96. Slot controller 88 couples a control signal over lead 97 to the control input of multiplexer 98. Slot controller 88 couples a control signal over lead 99 to a control input of multiplexer 100.

Bidirectional bus 28 is coupled to an I/O port of multiplexer 98. In response to the control signal on lead 97, multiplexer 98 couples bidirectional bus 28 to one of leads 101, 102 or 103. Lead 101 is coupled to a data input of global bus sender 90. Lead 102 is coupled to a data input of vertical bus sender 92. Lead 103 is coupled to a data input of local lower bus sender 96.

Bidirectional bus 31 is coupled to an I/O port of multiplexer 100. Multiplexer 100 couples bidirectional bus 31 to one of leads 104, 105 or 106 in response to the control signal on lead 99.

Processor 47′, which may be for example an independent computer or utilization device, is coupled over lead 108 to a data port of global bus sender 90 and vertical bus sender 92. Processor 47′ is coupled over lead 110 to a data port of local upper bus sender 94. Processor 47′ is coupled over lead 111 to a data port of lower local bus sender 96. One example of an embodiment of global bus sender 90 may be senders 45 and 46, shown in FIG. 3 with the addition that lead 89 would couple to channel status registers 60 and 60′ and data word register 62 and bit register 62′. Leads 70 and 70′ may be coupled together to the data port of sender 90. One example of vertical bus sender 92 is senders 45 and 46, shown in FIG. 3, with the addition that lead 91 would be coupled to channel status registers 60 and 60′ and data word register 62 and bit register 62′. One example of local upper bus sender 94 is sender 45′, shown in FIG. 4, with the addition of lead 93 being coupled to channel status register 60″ and data word register 62″. One example of local lower bus sender 96 is sender 45′, shown in FIG. 4, with the addition that lead 95 would be coupled to channel status register 60″ and data word register 62″. Leads 27 and 70, shown in FIG. 4, would correspond to leads 103 and 111, respectively, shown in FIG. 6. Leads 70 and 70′, shown in FIG. 3, would be coupled in common to lead 108 shown in FIG. 6. Leads 27 and 31, shown in FIG. 3, would be coupled in common to lead 101 and 104, respectively, shown in FIG. 6. Leads 27 and 31, shown in FIG. 3, would correspond to leads 102 and 105, respectively, of vertical bus sender 92, shown in FIG. 6.

In operation of node 15, shown in FIG. 1 and FIG. 6, slot controller during time slot 2, as shown in FIG. 5, would cause multiplexer 98 to couple bidirectional bus 28 to global bus sender 90 by way of lead 101. During slot 2, global bus sender 90 may transmit and receive for forwarding a bit under the CITO protocol on bidirectional bus 28.

During time slot 3, slot controller 88 would cause multiplexer 98 to couple bidirectional bus 28 to vertical bus sender 92 by way way of lead 102. Slot controller 88 would cause multiplexer 100 to couple bidirectional bus 31 to global bus sender 90 by way of lead 104. Slot controller 88, during time slot 3, would cause global bus sender 90 to transmit a data bit under the CITO protocol on bidirectional bus 31. Slot controller 88 would also cause vertical bus sender 92 to transmit and receive for forwarding a data bit on bidirectional bus 28 under the CITO protocol. The transmission of a data bit on bidirectional bus 28 is represented by point 80 in FIG. 5. The transmission of a data bit on bidirectional bus 31 is represented by point 40 on curve 38 in FIG. 5.

During time slot 4, slot controller 88 causes a control signal on line 99 to multiplexer 100 to cause multiplexer 100 to couple bidirectional bus 31 to vertical bus sender 92 by way of lead 105. Further, slot controller 88 causes vertical bus sender 105 to transmit and receive a vertical bus data bit on bidirectional bus 31 under the CITO protocol. During time slot 4, global bus sender 90 is shown in FIG. 5 as being inactive.

During time slot 5, slot controller 88 causes multiplexer 100 to couple bidirectional bus 31 to global bus sender 90 by way of lead 104. Slot controller 88 sends a control signal 89 to global bus sender 90 to cause global bus sender 90 to receive only, such as in the channel status register 60 shown in FIG. 3, that data bit transmitted on bidirectional bus 31 from node 2 shown in FIG. 1. During time slot 5, global bus sender 90 does not attempt to transmit a data bit under the CITO protocol on bidirectional bus 31. Slot controller 88 during time slot 5 causes vertical bus sender 92 to transmit the data bit received on bidirectional bus 31 during time slot 4 on to bidirectional bus 28. Slot controller 88 causes multiplexer 98 to couple bidirectional bus 28 to vertical bus sender 92 by way of lead 102. The transmission of a data bit on bidirectional bus 28 is represented in FIG. 5 by data point 82 on curve 78. Concurrently in time slot 5, the transmission of a data bit on bidirectional bus 31 is represented by point 42 shown on curve 44 in FIG. 5.

During time slot 6, slot controller 88 sends a control signal over lead 97 to multiplexer 98 to cause multiplexer 98 to couple bidirectional bus 28 to global bus sender 90 over lead 101. Slot controller 88 couples a control signal over lead 89 to global bus sender 90 to cause global bus sender 90 to transmit the data bit received during time slot 5 over bidirectional bus 28. The transmission of a data bit on bidirectional bus 28 is shown in FIG. 5 as point 43 on curve 44.

Slot counter 84 continues to cycle through time slots 1-7, thereby causing slot controller 88 to repeat the control signals resulting in words from all the nodes being transmitted under the CITO protocol up in hierarchical level and transmitted down in hierarchical level without the CITO protocol.

In order for nodes 18-25 to send two different messages during time slots 2 and 3 and receive messages during time slots 5 and 6, each node may have two duplicate senders 45', shown in FIG. 4. Each sender 45' would operate during respective time periods 2 and 6 and time periods 3 and 5. Processor 47 or the utilization device coupled to or as part of each node 18-25 may have additional input ports for coupling to each sender 45'. Nodes 18-25 would each require a slot counter 84 and slot controller 88 with control signals from slot controller 88 going to the channel status register 60" and data word register 62", shown in FIG. 4.

When hierarchically connected system 10 is operated in full system and partial system modes, the time slots at hierarchical level I are still not completely utilized by all bidirectional buses, 27-33. The bidirectional buses at hierarchical level I, such as bidirectional bus 27, will have slots 1, 4 and 7 available for local communication, as shown in FIG. 5. An additional sender 45' may be required at each node 18-25 to transmit and receive data bits during time slots 1, 4 and 7. In estimating the needs of a hierarchically connected system 10, time slots 1 and 7 were added to provide added local communication time on all bidirectional buses, 27-30. Otherwise, nodes 18-25 would be available for strictly local traffic or communication during time slot 4. Nodes 14-17 may also communicate during time slots 1, 4 and 7 by utilizing local lower bus sender 96, shown in FIG. 6, which may be constructed as shown by sender 45' in FIG. 4, except for the addition of lead 95 being coupled to channel status register 60" and data word register 62". On the next higher bus level, such as bidirectional buses 31 and 32, time slots 2 and 6 are available for local communication as well as time slots 1 and 7. Local upper bus sender 94, shown in FIG. 6, may be used for each node 14-17 during time slots 1, 2, 6 and 7. Local upper bus sender 94 may be, for example, sender 45' shown in FIG. 4, with the addition of lead 93 being coupled to channel status register 60" and data word register 62".

On the top level bus, bidirectional bus 33, time slots 1-3 and 5-7 are available for local communication. Nodes 12 and 13 may be constructed as shown in FIG. 6 with the deletion of vertical bus sender 92 which may not be needed. Local upper bus sender 94, shown in FIG. 6, would participate in local communications during time slots 1-3 and 5-7.

Local bus communication, along with hierarchical bus communication, as shown in FIG. 5, matches well with the basic needs of hierarchical, multiprocessor systems where the executive functions tend to be found on the higher level nodes in the hierarchy, and application processing functions tend to be at the lower level nodes. Presumably, nodes running application tasks tend to need broad coverage to ensure that data from anywhere in the system can easily be shared, and nodes running executive functions generally share data with only a few nodes up and down the hierarchy. Nevertheless, all nodes have a mix of communications coverage through the matching of messages to time slots.

By using the basic CITO protocol to transmit data bits to hierarchical levels in hierarchically connected system 10, it is possible to take advantage of some known properties of the CITO protocol. For instance, according to the basic CITO protocol, if a zero is transmitted on the bidirectional bus for transmission to higher hierarchical levels, a zero will be received from the higher hierarchical level in a later time slot. Thus, if a signal transmitted on bidirectional bus 28 in time slot 2 is a zero, it can be concluded that a zero will result in time slot 6 on bidirectional buses 27-30. Since the information in time slot 6 is redundant on bidirectional bus 28, time slot 6 may be used for a single bit of local communication on bidirectional bus 28. This may be provided for in global bus sender 90, shown in FIG. 6, by adding logic to inhibit global bus sender 90 from transmitting a zero in time slot 6 at times it receives a zero over lead 101 during time slot 2. The use of time slot in this manner may also be applied to bidirectional buses 27, 29 and 30. The logic in global bus sender 90 may be modified to send a signal to slot controller 88 during time slot 2 over lead 91 to permit slot controller 88 to activate local lower bus sender 96 during time slot 6. Likewise, slot controller 88 associated with nodes 18-25 would need to receive a signal from sender 45' by the addition of logic so that slot controller 88 may activate sender 45' for transmitting a local data bit using a CITO protocol during time slot 6.

If a zero is transmitted during time slot 3 as shown in FIG. 5 using the CITO protocol on hierarchical level I bidirectional bus, time slot 5 may be used for local communication if a zero is detected in time slot 3 on the respective bidirectional buses 27-30. Vertical bus sender 92 would contain additional logic to inhibit transmission during time slot 5 when a zero was transmitted over lead 102 during time slot 3. Certain bidirectional buses may be used for the transmission of data bits during additional time slots by recognizing that under the CITO protocol when a one data bit has been transmitted in time slot 2 and a zero has been received in time slot 6, transmission of additional data bits is suspended for the remainder of the word. Thus, if a one is detected on bidirectional bus 28 in time slot 2, it means all devices, nodes 20, 21 and 15, are trying to transmit a one on bidirectional bus 28. If a zero is received in time slot 6, all nodes connected to bidirectional bus 28 will suspend transmission of additional data bits until a word is transmitted by one or more other nodes not associated with bidirectional bus 28. Nodes 15, 20 and 21 will resume global transmission in time slot 2 during bit competition.

Logic, for example comparator 120, circuitry may be added to global bus sender 90 to compare the channel status register 60 with the data word register 62 to determine when a '1' is transmitted and a '0' is received.

The additional logic circuitry may include a signal over lead 114 to slot controller 88 during time slot 2 indicating the availability of time slot 2 for local message traffic on bidirectional bus 28. Likewise, nodes 20 and 21 may contain additional logic to recognize when a '1' has been transmitted on bidirectional bus 28 during time slot 2 and a zero has been received during time slot 6. The additional logic may include a comparator to compare the data bit in channel status register 60″ with the data bit in data word register 62″ of sender 45′ shown in FIG. 4.

Node 15 will continue transmitting on bidirectional bus 28 during time slot 6 until complete transmission of the word.

By including additional logic in the nodes coupled to other bidirectional buses, such as bidirectional buses 27, 29-32, time slot 2 may be used for local message traffic when a '1' is transmitted during time slot 2 previously and a '0' is received in time slot 6.

The same additional logic may be used to detect when a '1' is transmitted on a bidirectional bus in time slot 3 and a '0' is received in time slot 5, such as bidirectional buses 27-30. The same logic also applies when a '1' is transmitted in time slot 3 on hierarchical level II and a '0' is received in time slot 5 on hierarchical level II, on bidirectional buses 31 and 32.

As shown in FIG. 5, additional time slots are available to provide for additional communication between hierarchical levels I through III. For example, in cases where it is desirable to increase the amount of communication between hierarchical level II and hierarchical level III, time slot 2 may be used to transmit a data bit under the CITO protocol on bidirectional buses 31 and 32. Time slot 5 may be used to transmit the data bit received during time slot 2 on bidirectional bus 33 and time slot 6 may be used to transmit the data bit actually transmitted on bidirectional bus 33 during time slot 5 on bidirectional buses 31 and 32. In a similar fashion, time slots and 1 and 7 on bidirectional buses 31 and 32 may be used with time slot 2 on bidirectional bus 33 for additional communication between hierarchical level II and hierarchical level III. It is understood that if the messages to be transmitted are independent from other messages to be transmitted from one hierarchical level to another, then the node would need to provide an additional sender 45 and sender 46 or the equivalent thereof. If it is desirable to increase the level of local communication, additional time slots may be appended after time slot 7 for local communication use or for use in any of the optional or standard methods described. The addition of time slots and the message routing into or through a node is controlled by slot controller 88. Slot controller 88 may have a memory for storing the number of slots in a cycle and for storing the sender to be activated during a particular time slot to effect overall communication between the nodes in hierarchically connected system 10. Such flexibility allows the communication network of a multiprocessor system to be tailored to the communication, data storage and computing needs of the system.

By controlling the nodes at each hierarchical level during each time slot, several distinct virtual communication buses may be established, such as a local bus on each hierarchical level, buses that pass between hierarchical levels belonging to a single top level node, and global buses where every node receives the message transmitted. Each bus may be called a virtual bus even though its messages may or may not share common wires. Messages on each bus may have unique or identical word lengths, such as 24 bits or 32 bits. By utilizing a template 120, as shown in FIG. 7, which designates which virtual bus or message path is used or transmitting at each hierarchical level during each time slot, the complete communication within hierarchically connected system 10 can be controlled where each slot controller 88 in each node has stored therein template 120. In FIG. 7, the ordinate of template 120 represents hierarchical level and the abscissa of template 120 represents the time slot. The letter "L" represents local bus transmission. The letter "V" represents vertical bus transmission, and, the letter "G" represents global bus transmission. The letter "S" represents test transmission. The location of the letter in template 120 represents the activity or character of transmission at each hierarchical level and time slot. The template may reconfigured or the template may be expanded by adding time slots to control the message flow within hierarchically connected system 10. Slot controller 88 may contain several preprogrammed templates which are then activated by message. Alternately, each slot controller 88 may contain a start-up template to initially control the message flow through each node during each time slot before switching to other templates depending on the needs of the hierarchically connected system 10, shown in FIG. 1.

A method and apparatus has been described for distributing data comprising a plurality of nodes at each of a plurality of hierarchical levels, each node including means for receiving and transmitting data, the plurality of nodes at a hierarchical level interconnected to one or more bidirectional buses, each bidirectional bus interconnected through a node to a node on a bidirectional bus at a hierarchical level by a first sender, each first sender having a first port coupled to first bidirectional bus at a first hierarchical level and a second port coupled to a second bidirectional bus at a higher hierarchical level, the first sender having a first means coupled to the first port for receiving a first data bit transmitted on the first bidirectional bus by means of the Content Induced Transaction Overlap (CITO) protocol during a first time slot, the first sender having second means coupled to the first means and to the second port for transmitting the first data bit on the second bidirectional bus by means of the CITO protocol during a second time slot after the first time slot, the second means including a channel status register for storing the data bit actually transmitted under the CITO protocol on the second bidirectional bus during the second time slot, the first sender having a fourth means coupled to the first port and to the second means for transmitting without regard to the CITO protocol the data bit in the channel status register onto the first bidirectional bus during a third time slot after the second time slot. The invention further includes a plurality of senders at selected nodes under the control of a slot controller for sending independent messages between the first and second bidirectional buses and for sending independent messages on the first and second bidirectional buses. Each sender may be connected to a processor associated with a particular node for utilizing one or more of the independent messages received by a sender or for transmitting one or more independent messages by way of one of one or more senders. The allocation of senders during each time slot may be altered by the slot controller 88.

The invention claimed is:

1. An apparatus for transmitting data between first (31) and second (32) bidirectional buses by way of at least a third bidirectional bus (33) comprising:
   a first sender (49) having a first port (64) coupled to said first bidirectional bus (31) and a second port (64') coupled to said third bidirectional bus, (33)
   a second sender (49) having a first port (64) coupled to said second bidirectional bus (32) and a second port (64') coupled to said third bidirectional bus, (33)
   each said first and second senders (49) having a first means (60) coupled to said first port (64) for receiving a first data bit transmitted on said respective first and second bidirectional buses (31,32) by means of the Content Induced Transaction Overlap (CITO) protocol during a first time slot,
   each said first and second sender (49) having second means (62') coupled to said first means a (60) and to said second port (64') for transmitting said respective first data bit on said third bidirectional bus (33) by means of the CITO protocol during a second time slot after said first time slot,
   said second means (62') including a channel status register (60') for storing the data bit actually transmitted under the CITO protocol on said third bidirectional bus (33) during said second time slot,
   each said first and second senders (49) having a third means (62) coupled to said first port (64) and to said second means (62') for transmitting without regard to the CITO protocol the data bit in said channel status register (60') onto said respective first (31) and second (32) bidirectional buses during a third time slot after said second time slot.

2. The apparatus of claim 1 wherein said first and second bidirectional buses are at the same hierarchial level.

3. A method for distributing data between a plurality of nodes (12–25) interconnected by one or more bidirectional buses (27–33) at respective hierarchial level into a hierarchial tree (10) comprising the steps of:
   in respective time slots for each hierarchial level, first transmitting respective messages onto higher hierarchial bidirectional buses (31–33) from lower hierarchial bidirectional buses (27–30) by way of the Content Induced Transaction Overlap (CITO) protocol to a bidirectional bus (33) at a predetermined hierarchial level, and
   second transmitting the message arriving at said bidirectional bus (33) at said predetermined hierarchial level onto lower hierarchial bidirectional buses (27–32) in respective time slots for each hierarchial level.

4. The method of claim 3 wherein said predetermined hierarchical level is the highest level in the hierarchical tree (10).

5. The method of claim 3 wherein lower hierarchical levels may be added by adding respective time slots for the steps of first and second transmitting.

6. Apparatus for distributing data comprising:
   a plurality of nodes (12–25) at each of a plurality of hierarchial levels,
   said plurality of nodes (11–25) at a hierarchial level interconnected to one of one or more bidirectional buses (27–30) at the respective hierarchial level,
   a first bidirectional bus (27–30) at a first hierarchial level interconnected to a first node (14–17) of said plurality of nodes (18–25) at a higher hierarchial level said first node including a first sender (49),
   said first sender (49) having a first port (64) coupled to said first bidirectional bus (27) at said first hierarchial level and a second port (64') coupled to a second bidirectional bus (31) at a higher hierarchial level,
   said first senser (49) having a first means (60) coupled to said first port (64) for receiving a first data bit transmitted on said first bidirectional bus (27) by means of the Content Induced Transaction Overlap (CITO) protocol during a first time slot, and
   said first sender (49) having second means (62') coupled to said first means (60) and to said second port (64') for transmitting said first data bit on said second bidirectional bus (31) by means of the CITO protocol during a second time slot after said first time slot.

7. The apparatus of claim 6 wherein said second means (62,) includes a channel status register (60') for storing the data bit actually received under the CITO protocol on said second bidirectional bus (31) during said second time slot, and
   said first sender (49) includes a third means (62) coupled to said first port (64) and to said second means (60') for transmitting without regard to the CITO protocol the data bit in said channel status register (60') onto said first bidirectional bus (27) during a third time slot after said second time slot.

8. The apparatus of claim 7 wherein said first sender (49) of a node includes fourth means (120) for inhibiting said third means from transmitting during said third time slot at times said first data bit is zero.

9. The apparatus of claim 7 wherein a node coupled to said first bidirectional bus (27) includes a second sender (45',49) for transmitting a portion of a second message word under the CITO protocol during said second time slot for the remainder of a first message word at times a '1' was transmitted by said second means (62') during the previous second time slot and a '0' data bit was actually received onto said first bidirectional bus (27) during the previous third time slot.

10. The apparatus of claim 6 wherein at least one of said nodes (12–25) includes a source of data (47) for distribution to said other nodes (12–25).

11. The apparatus of claim 6 wherein one of said first senders (49) includes fourth means (45,46) for receiving data over a third port (70,70') for distribution to other nodes (12–25).

12. The apparatus of claim 6 wherein said first sender (49) includes a third means (60') coupled to said second port (64') for receiving a data bit transmitted on said second bidirectional bus (31) during a third time slot.

13. The apparatus of claim 12 wherein said first sender (49) includes a fourth means (62) coupled to said third means (60') and to said first port (64) for transmitting said data bit received by said third means (60') during said third time slot on said first bidirectional bus (27) during a fourth time slot.

14. The apparatus of claim 6 wherein said second bidirectional bus (31,32) at said higher hierarchial level is interconnected through a second node (12,13) to a third bidirectional bus at a second higher hierarchial level, said second node (12,13) including said first sender (49).

15. Apparatus for distributing data comprising: a plurality of nodes (12–25) at each of a plurality of hierarchial levels,
   said plurality of nodes (18–25) at a hierarchial level interconnected to one of one or more bidirectional buses (27-30) at the respective hierarchial level, a first bidirectional bus (27-30) interconnected through a node to a second bidirectional bus (31-32) at a higher hierarchial level by a respective plurality of first senders (49) coupled between said first (27-30) and second (31-32) bidirectional buses for transmitting or receiving respective messages from each said bus (27-32) during predetermined time slots wherein a data bit is transmitted or received during a time slot, and wherein said plurality of first senders (49) each include means (60,62') for transmitting respective messages on higher hierarchial bidirectional buses (31-32) by way of the Content Induced Transaction Overlap (CITO) protocol.

16. The apparatus of claim 15 wherein said plurality of bus senders (49) each includes means (60',62) for transmitting respective messages on lower hierarchial bidirectional buses (27-30) by way of retransmission of the bit received from a bidirectional bus of a higher hierarchial level.

17. The method of claim 3 further including the steps of:

in other respective time slots for each hierarchial level, third transmitting other messages onto higher hierarchial bidirectional buses (31-33) from lower hierarchial bidirectional buses (27-30) by way of the Content Induced Transaction Overlap (CITO) protocol to a bidirectional bus (33) at another predetermined hierarchial level.

18. The method of claim 17 further including the step of:

fourth transmitting the message arriving at said bidirectional bus (33) at said another predetermined hierarchial level onto lower hierarchial bidirectional buses (27-32) in other respective time slots for each hierarchial level.

19. The method of claim 3 further including the steps of:

controlling the nodes at each hierarchial level during each time slot to provide several distinct virtual communication buses.

* * * * *